United States Patent [19]

Rudibaugh

[11] Patent Number: 4,902,522
[45] Date of Patent: Feb. 20, 1990

[54] MEAT VACUUMIZER SYSTEM AND PROCESS

[75] Inventor: Charles R. Rudibaugh, Chicago, Ill.
[73] Assignee: Cozzini, Inc., Chicago, Ill.
[21] Appl. No.: 377,465
[22] Filed: Jul. 10, 1989
[51] Int. Cl.$^4$ .................. A23B 4/00; G01N 33/02
[52] U.S. Cl. ...................................... 426/231; 99/472; 426/486
[58] Field of Search .................. 426/231, 486; 99/472, 99/477; 34/15, 92; 241/DIG. 14

[56] References Cited
U.S. PATENT DOCUMENTS 4,446,779 5/1984 Hubbard et al. ...................... 99/472
4,522,118 6/1985 Simonsen et al. ...................... 99/472

Primary Examiner—George Yeung
Attorney, Agent, or Firm—Lee, Mann, Smith, McWilliams & Sweeney

[57] ABSTRACT

A system and process for vacuumizing meat to remove oxygen and air voids therefrom, thereby increasing the density and shelf-life of the meat, the system including a variable speed positive displacement transfer pump to deliver a supply of pre-cut meat under pressure to a sealed vacuumized pressure vessel where the meat is vacuumized, the transfer pump being adjustable in speed to vary the rate of flow of meat therefrom to achieve the maximum output of vacuumized meat.

5 Claims, 1 Drawing Sheet

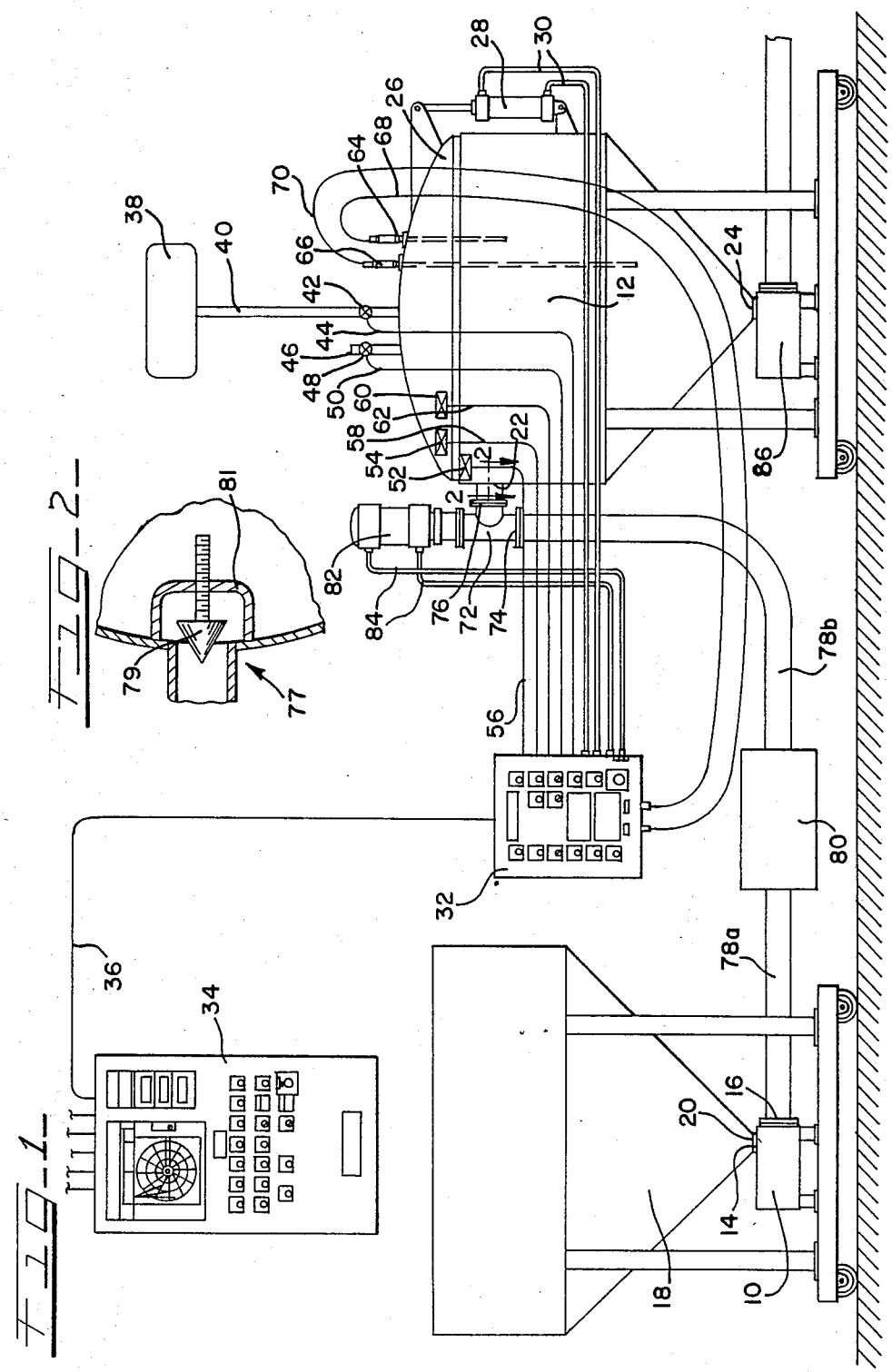

MEAT VACUUMIZER SYSTEM AND PROCESS

BACKGROUND OF THE INVENTION

The present invention is directed to a system and process for vacuumizing meat. Various arrangements of this general type are shown in the prior art U.S. Pats. Nos. 3,508,315, 3,743,192, 4,382,404, 4,479,614 and 4,700,899. None of these arrangements disclose the features of the present invention.

SUMMARY OF THE INVENTION

The present invention provides a meat vacuumizing system including a variable speed positive displacement transfer pump adapted to receive a supply of pre-cut meat and deliver the meat under pressure to a sealed pressure vessel located downstream from the pump. The rate of flow of the meat from the pump to the vessel may be selectively varied by a control to accommodate the specific vacuumizing process being performed. An expansion valve in communication with the pump and the vessel defines a shearing gap which is infinitely adjustable to give the meat entering the pressure vessel maximum surface exposure so that maximum removal of surface air is achieved. A meat inlet valve is associated with the expansion valve to open or close communication between the pump and the pressure vessel. A feed pump is associated with the pressure vessel and is adapted to receive vacuumized meat therefrom and transport the meat to an emulsion mill for further processing.

BRIEF DESCRIPTION OF THE DRAWINGS

FIG. 1 shows a schematic view of the meat vacuumizing system of the present invention.

FIG. 2 is a section view showing the details of the expansion valve.

DETAILED DESCRIPTION OF THE INVENTION

Vacuumizing meat removes oxygen and air voids from the meat, thereby increasing the density of the meat. Vacuumization also retards bacterial growth, thereby increasing the shelf life of the packaged product. A superior, more healthful product is presented to the consumer. A system for vacuumizing meat is schematically illustrated in the drawing. The system includes a variable speed positive displacement transfer pump 10 adapted to receive a supply of pre-cut meat and deliver the pre-cut meat under pressure to a sealed, pressure vessel 12, where the meat is vacuumized.

The variable speed pump 10 has an inlet 14 and an outlet 16. The inlet 14 communicates with a hopper 18 via an outlet 20 defined in the base thereof and is adapted to receive, under pressure, a supply of pre-cut meat from the hopper 18. A speed control means (not shown) is associated with the variable speed pump 10 to selectively vary the speed of the pump 10 and thereby meter or vary the flow of meat therefrom at a desired rate.

The pressure vessel 12 is adapted to receive the meat from the variable speed pump 10 and includes an inlet 22 and an outlet 24. A lid 26 is releasably secureable to the vessel 12. A hydraulic cylinder 28 is connected between the lid 26 and the vessel 12 to raise and lower the lid 26. The hydraulic cylinder 28 is connected via conduits 30 to a pressure vessel control panel 32, which is connected to a main control panel 34 by a cable or wire 36. A vacuum pump 38 is connected to the vessel 12 by means of a tube 40 which has one end attached to the vacuum pump 38 and the other end attached through the lid 26 of the vessel 12. A vacuum valve 42 is provided at the lower end of the tube 40 and is connected via line 44 to control panel 32 which supplies energy to the vacuum valve 42 to open and close it.

A venting tube 46 is provided through the top of the lid 26 for venting the pressure vessel 12 to atmosphere. An actuating valve 48 is provided with the tube 46 to control venting the pressure vessel 12 to atmosphere or sealing it therefrom. The actuating valve 48 is connected to the control panel 32 by line 50. Also associated with the lid 26 are a lid open sensor 52 and a lid closed sensor 54, which are connected to the control panel 32 by lines 56 and 58, respectively. The sensors 52 and 54 provide a safety interlock system. Sensor 52 indicates when the lid 26 is completely latched open so that it will not inadvertently fall shut. Sensor 54 indicates when the lid 26 is completely latched shut so that the vacuumization process can begin. A vacuum switch 60 is connected to the lid 26 and receives power from the control panel 32 via line 62. The vacuum switch 60 senses when the vacuum in the pressure vessel 12 has reached the desired range of between 22"-25" Hg. before meat is communicated thereto.

A first sensor 64 and a second sensor 66 are secured through the lid 26 and directed downwardly into the pressure vessel 12. The sensors 64 and 66 are insulated conductivity probes which receive power from the control panel 32 via cables 68 and 70, respectively. The first sensor 64 is operative to detect an upper level of meat product in the pressure vessel 12 and the second sensor 66 is operative to detect a lower level of meat product therein. When the first sensor 64 contacts the meat, it signals that the pressure vessel 12 has filled to a predetermined upper level and the variable speed pump 10 is de-energized so that no more meat is communicated therefrom to the pressure vessel 12. When the second sensor 66 signals that the vessel 12 is empty or has reached a predetermined lower level, the variable speed pump 10 is energized so that meat is communicated from the pump 10 to the vessel 12.

A meat inlet valve 72 is shown having an inlet 74 and an outlet 76 connected to the side of the pressure vessel 12. An expansion valve 77, best shown in FIG. 2, is positioned adjacent the outlet 76 to admit meat to the vessel. The expansion valve 77 includes a conical shaped valve head 79 adjustably mounted in a bracket 81 so as to vary the shearing gap defining the entrance to the pressure vessel.

The inlet 74 of the meat inlet valve 72 communicates with the outlet 16 of the variable speed pump 10 via conduit 78. In the preferred system, one portion of the conduit 78a connects the outlet 16 of the variable speed pump 10 to an emulsifier 80 and the other portion 78b connects the emulsifier 80 to the inlet 74 of the expansion valve 77. In some instances, the emulsifier 80 is omitted entirely and in other instances, two emulsifiers are used, one between the transfer pump and the pressure vessel and one downstream of the pressure vessel. Other systems only use an emulsifier downstream of the pressure vessel.

An actuater 82 for the meat inlet valve 72 is shown in FIG. 1. Energy is supplied from the control panel 32 via conduit 84 to operate the actuator 82 and the inlet valve 72 between an open position and a closed position.

When the inlet valve 72 is in an open position meat is allowed to flow from the variable speed pump 10 through the expansion valve 77 into the pressure vessel 12. When the inlet valve 72 is closed, the expansion valve 77 and pressure vessel 12 are sealed, thereby preventing the flow of meat from the variable speed pump 10.

Vacuumized meat exits the pressure vessel 12 through the outlet 24 and enters a feed pump 86 in communication therewith. The meat is transported from the feed pump 86 to an emulsion mill (not shown) for further processing.

The process for vacuumizing the pre-cut meat will now be described. The pre-cut meat is loaded into the hopper 18. The main control panel 34 and pressure vessel control panel 32 are activated to close the vessel lid 26. The second sensor 66 senses that the supply of meat in the pressure vessel 12 has reached a predetermined lower limit sending a signal to the control panel 32 to open the vacuum valve 42, energize the vacuum pump 38 and draw a vacuum within the pressure vessel 12. When the vacuum in the pressure vessel 12 reaches the desired range of between 22"-25" Hg., the vacuum switch 60 sends a signal to open he meat inlet valve 72.

When the inlet valve 72 is opened, the expansion valve 77 is exposed open to a predetermined air gap setting of, for example, one-eighth inch. After opening of the inlet valve there is a five second delay and the variable speed pump 10 is then energized and meat from the hopper 18 enters through the pump inlet 14 and is metered through the pump outlet 16 at a predetermined rate of flow. The operator selects the rate of flow based on the desired specific gravity of the meat which is preferably between 1.04 and 1.05. It is important to select a rate of flow which is neither too fast nor too slow. If the rate of flow of the meat from the variable speed pump 10 to the pressure vessel 12 is too fast, good evacuation of the meat is not achieved. If the rate of flow is too slow, good evacuation is achieved, but the desired production rate of pounds of vacuumized meat per hour is not achieved. The infinitely adjustable pump 10 permits the proper positive displacement rate of flow to be selected in order to achieve the maximum poundage of vacuumized meat per hour based on the desired specific gravity of the vacuumized meat.

The meat flows out the pump outlet 16 and travels through the conduit 78. If the system includes an emulsifier meat flows into the emulsifier 80. The emulsified meat flows out the emulsifier 80 into the conduit 78b and through the expansion valve 77 which has been adjusted to yield the desired shearing gap, generally between one-eighth to one-quarter inch. Adjustment of the expansion valve 77 permits a very thin layer of meat to enter the pressure vessel 12 thereby yielding maximum surface exposure of the meat for removal of surface air therefrom.

The meat is pumped through the expansion valve 77 and into the pressure vessel 12 until the first sensor 64 senses that the meat has reached the predetermined upper level. The first sensor 64 then sends a signal to the control panel 32 deenergizing the variable speed pump 10. After a time delay of approximately five seconds, the meat inlet valve 72 is closed, thereby prohibiting the access of meat into the expansion valve 77. The expansion valve 77 and the pressure vessel 12 are sealed. The vacuum in the pressure vessel 12 is held at a static range of between 27" and 29" Hg. for between approximately thirty to sixty seconds. The actuating valve 48 of the venting tube 46 is opened and the pressure vessel 12 then is vented to atmosphere. When vacuum switch 60 senses a low level of vacuum, for example, six to eight inches mercury then the feed pump 86, in communication with the pressure vessel 12, is energized and the vacuumized meat is withdrawn from the pressure vessel 12 into the feed pump 86 where it is force fed into the emulsion mill. As . soon as the second sensor 66 senses that the meat has reached the predetermined lower level, the feed pump 86 is deenergized and the cycle is begun again.

Thus it has been shown that the present invention provides an improved system and process for quickly and efficiently vacuumizing meat to remove the oxygen and air voids therefrom and to increase the density thereof.

Various features of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. A meat vacuumizing system including a variable speed positive displacement transfer pump having an inlet adapted to receive a supply of pre-cut meat and an outlet to deliver said pre-cut meat under pressure; speed control means associated with said pump for selectively varying the speed of said pump to thereby vary the rate of flow of meat from said pump; a sealed pressure vessel located downstream from said transfer pump and adapted to receive meat from said transfer pump, said vessel having an inlet and an outlet; means associated with said sealed vessel to draw and maintain a vacuum therein; an expansion valve in communication with said outlet of said transfer pump and said inlet of said pressure vessel; adjustment means associated with said expansion valve to provide an infinitely adjustable gap for the admission of meat; a meat inlet valve disposed between said expansion valve and said transfer pump adapted to open or close communication between said transfer pump and said expansion valve and a feed pump associated with said outlet of said pressure vessel for receiving vacuumized meat from said vessel and transporting it to another location whereby meat is admitted to said pressure vessel, is vacuumized to remove oxygen therefrom and increase the density of the meat product and transported from said pressure vessel.

2. A meat vacuumizing system as in claim 1 in which said pressure vessel also includes a first sensor to detect an upper level of meat product in said vessel and a second sensor to detect a lower level of meat product in said vessel.

3. A meat vacuumizing system as in claim 2 including control means associated with said variable speed pump and said first and second sensors, whereby said control means is effective to deenergize said variable speed pump when said first sensor signals that said meat product has reached said upper level and effective to energize said variable speed pump when said second sensor signals that said meat product has reached said lower level.

4. A meat vacuumizing system as in claim 1 including an emulsifier disposed between said variable speed pump and said meat inlet valve.

5. A process for vacuumizing pre-cut meat in a pressurized vessel, the steps of the process comprising:

a) sensing that the supply of meat in said pressure vessel has reached a predetermined lower limit;
b) drawing a vacuum in said pressure vessel;
c) opening an expansion valve disposed between said pressure vessel and a variable speed transfer pump in communication with a supply of pre-cut meat;
d) energizing said transfer pump to deliver a supply of pre-cut meat to said pressure vessel through said expansion valve until the meat has reached a predetermined upper level;
e) closing said expansion valve;
f) deenergizing said transfer pump;
g) sealing said pressure vessel;
h) holding said vacuum in said pressure vessel at a static range of between 27"–29" Hg. for between approximately 30 and 60 seconds;
i) venting said pressure vessel to atmosphere; and
j) energizing a feed pump in communication with an outlet of said pressure vessel to withdraw vacuumized meat from said vessel and transport it to another location for further processing.

* * * * *